Sept. 22, 1931.  D. McF. MOORE  1,824,731
PICTURE TRANSMITTING SYSTEM
Filed July 9, 1929

Inventor:
Daniel Mc Farlan Moore,
by Charles E. Tullar
His Attorney.

Patented Sept. 22, 1931

1,824,731

UNITED STATES PATENT OFFICE

DANIEL McFARLAN MOORE, OF EAST ORANGE, NEW JERSEY, ASSIGNOR TO GENERAL ELECTRIC COMPANY, A CORPORATION OF NEW YORK

PICTURE TRANSMITTING SYSTEM

Application filed July 9, 1929. Serial No. 377,004.

My invention relates to systems for transmitting pictures and has for its principal object the provision of an improved picture transmitting apparatus and method of operation, whereby the light applied to the original or reproduced picture may be utilized to the fullest extent and the picture produced may be made of any desired size and may be caused to have any desired number of scanning lines.

In the operation of various types of picture transmitting apparatus provided in the past, the light reflected from the successive elemental areas of the picture is projected thru a scanning device, such as a perforated or lens disc, into a light sensitive cell which is utilized to modulate the output current of a radio transmitter. This modulated current may be supplied through the receiving apparatus to a light source, such as a gaseous conduction lamp or the like, which produces a light dependent on the shading of the successive elemental areas of the picture and projects this light through a suitable scanning device on the receiving screen. These types of apparatus have not been altogether satisfactory in operation for the reason that the light produced by the gaseous conduction lamp is more or less limited in intensity and a large part of this light is cut off by the perforated disc or other scanning means utilized. In accordance with my invention this difficulty is obviated by the provision of movable reflecting surfaces whereby the full intensity of the light may be utilized and the reproduced picture may be readily controlled both as to its size and to the number of its scanning lines.

My invention will be better understood from the following description when considered in connection with the accompanying drawings and its scope will be pointed out in the appended claims.

Figure 1:
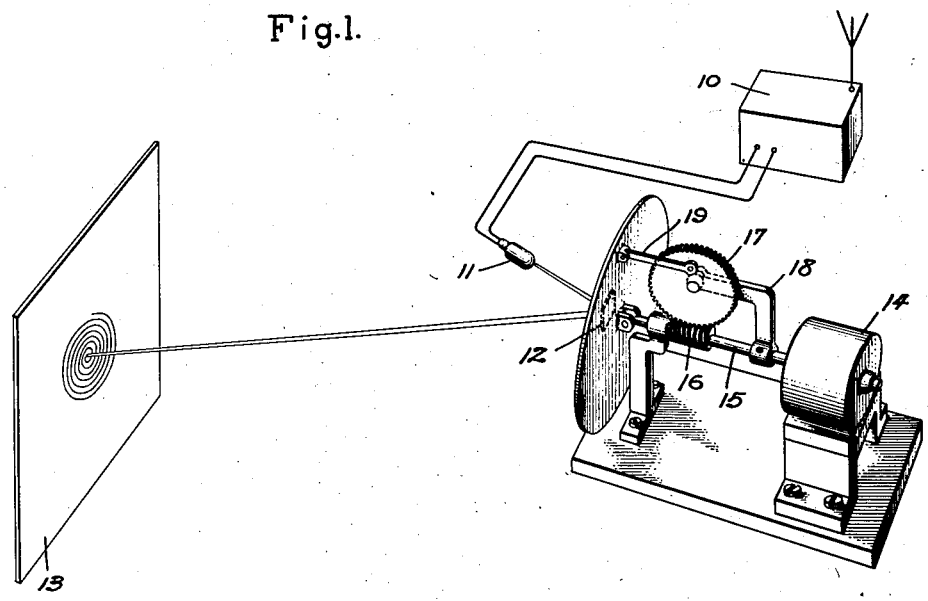
Figure 2:
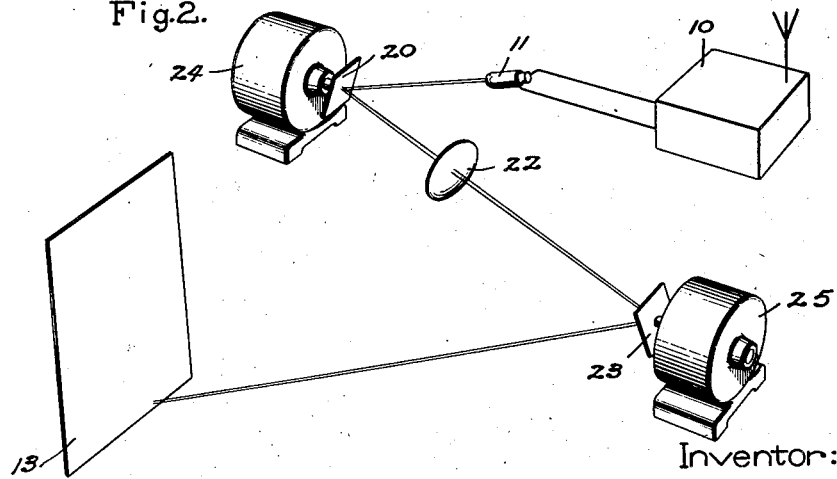

Referring to the drawings, Fig. 1 is a diagrammatic showing of a picture receiving apparatus wherein my invention has been embodied; and Fig. 2 illustrates a modification of this apparatus.

The apparatus illustrated by Fig. 1 comprises a radio receiver 10 which is supplied with electrical signals or impulses modulated in accordance with the shading of the successive elemental areas of the picture to be transmitted, and which has its output terminals connected to a light source, such as a lamp 11. It will of course be apparent that the lamp 11 may be replaced by any suitable light control device such as a Kerr cell, an arc lamp or the like. Light from the lamp 11 modulated in accordance with the shading of the successive elemental areas of the picture is projected on a mirror 12 and is reflected from this mirror on the picture receiving screen 13. Both the rotational speed of the mirror 12 and its angle with respect to its rotational axis are varied. The mechanism by which this result is accomplished includes a driving motor 14 mounted on a shaft 15 to one end of which the mirror support is hinged or pivoted. It will be observed that the shaft 15 is provided with a bearing 16 which is threaded at its outer perimeter to form a worm which cooperates with a gear 17. The gear 17 is rotatably mounted at the end of an L shaped member 18 which is fixed to the shaft 15. Connected between the mirror support and the gear 17 is an arm 19 which has a pivoted connection to the gear 17, this pivotal connection being slightly spaced from the rotational axis of the gear.

The operation of the apparatus will be readily understood. Assuming the motor 14 to be rotating at any suitable speed, the mirror and the gear 17 are rotated about the rotational axis of the shaft 15. Due to the rotation of the gear 17 about the stationary worm 16, the mirror 12 and its support are tilted back and forth at a speed which is dependent on the gear ratio. The angle through which the mirror and its support are tilted determines of course the size of the picture, and the relation between the speed of the motor and the rapidity with which the mirror and its support are tilted determines the number of lines of the picture. As will be readily understood, a single spiral line is traced if a single lamp 11 is provided. By providing more than one light source a plurality of modulated light beams tracing alternate spirals may be produced. It should be understood that the apparatus may also be used at the picture transmitting station for the purpose of scanning a picture and projecting the light reflected from the picture into a light sensitive cell which modulates the output current of the radio transmitter.

I have determined that a plurality of tilted mirrors driven at different speeds may also be utilized either to scan the picture or to trace the reproduced picture on the receiving screen. As indicated by Fig. 2, the modulated light of the lamp 11 may be applied to a tilted mirror or reflecting surface 20 from which it is reflected through a lens 22 on a tilted mirror 23 which in turn reflects the modulated light on the receiving screen 13. Suitable means, such as motors 24 and 25, are provided for rotating the mirrors 20 and 23 obtaining any suitable relation between their rotational speeds. As will be apparent, the mirrors 20 and 23 may be driven through suitable gears by different motors, by the same motor or in any other suitable manner. The lines traced by the modulated beam of light upon the screen 13 will of course depend on the relation between the speeds of the tilted mirrors and the directions in which the motors are driven. For example, by rotating the mirror 23 at a speed which is high as compared with that of the mirror 20. The scanning lines may be made comparatively dense at the center of the reproduced picture and comparatively far apart at the outer border of the picture. Such a picture is satisfactory under some conditions of operation.

As will be readily understood by those skilled in the art, the use of movable reflecting surfaces either for transmitting light from the picture to the light sensitive cell or for transmitting the modulated light from the light source to the receiving screen, has the very important advantages that it permits the use of all the available light, that pictures of any desired size and having any desired number of lines may be produced on the receiving screen, and that the apparatus is simple and rugged and may be readily constructed either in small or large sizes.

What I claim as new and desire to secure by Letters Patent of the United States, is:

1. In a picture transmitting system, a receiving apparatus comprising means for producing light modulated in accordance with the shading of the successive elemental areas of the picture to be transmitted, a screen, a plurality of rotatably mounted mirrors arranged to successively reflect said light to produce a trace on the screen, means for rotating said mirrors continuously in one direction at different speeds, and a lens arranged between said mirrors.

2. In a picture transmitting system, receiving apparatus comprising means for producing light modulated in accordance with the shading of successive elemental areas of the picture to be transmitted, a screen, and means for causing a beam of said light to describe a path on said screen forming a spiral, said means comprising a plurality of mirrors each mounted to rotate continuously in one direction and each inclined to its axis of rotation.

3. In a picture transmitting system, receiving apparatus comprising means for producing light modulated in accordance with the shading of successive elemental areas of the picture to be transmitted, a screen, and means for causing a beam of said light to describe a path on said screen forming a spiral, said means comprising a plurality of electric motors, a mirror mounted on the shaft of each motor and inclined to the axis thereof and a lens arranged in the path of light between said mirrors.

In witness whereof, I have hereto set my hand this 8th day of July, 1929.

DANIEL McFARLAN MOORE.